(12) United States Patent
Binks

(10) Patent No.: US 10,723,445 B2
(45) Date of Patent: Jul. 28, 2020

(54) STRAKE FOR AIRCRAFT PROPULSION SYSTEM NACELLE

(71) Applicant: Rohr, Inc., Chula Vista, CA (US)

(72) Inventor: Alan J. Binks, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 411 days.

(21) Appl. No.: 15/596,556

(22) Filed: May 16, 2017

(65) Prior Publication Data
US 2018/0334249 A1 Nov. 22, 2018

(51) Int. Cl.
*B64C 23/06* (2006.01)
*B64D 29/00* (2006.01)

(52) U.S. Cl.
CPC .............. *B64C 23/06* (2013.01); *B64D 29/00* (2013.01)

(58) Field of Classification Search
CPC .................................................... B64C 23/06
See application file for complete search history.

(56) References Cited

U.S. PATENT DOCUMENTS

| | | | |
|---|---|---|---|
| 4,540,143 A * | 9/1985 | Wang | B64C 7/02 244/130 |
| 4,739,957 A | 4/1988 | Vess et al. | |
| 4,884,772 A | 12/1989 | Kraft | |
| 4,917,333 A | 4/1990 | Murri | |
| 6,964,397 B2 | 11/2005 | Konings | |
| 8,087,617 B2 | 1/2012 | Sclafani et al. | |
| 2010/0011580 A1* | 1/2010 | Brennan | B29C 70/30 29/897.2 |
| 2012/0112011 A1 | 5/2012 | Emunds | |
| 2015/0329200 A1* | 11/2015 | Barrett | F15D 1/003 244/200.1 |
| 2016/0107746 A1 | 4/2016 | Tiwari et al. | |
| 2016/0159466 A1* | 6/2016 | Daggett | B64C 23/005 244/87 |
| 2016/0200420 A1* | 7/2016 | McKenna | B64C 13/16 244/215 |
| 2016/0243806 A1 | 8/2016 | Frost | |
| 2016/0375988 A1 | 12/2016 | Brown et al. | |
| 2016/0377090 A1 | 12/2016 | Brown et al. | |
| 2017/0081020 A1 | 3/2017 | Pujar et al. | |

* cited by examiner

*Primary Examiner* — Jessica B Wong
(74) *Attorney, Agent, or Firm* — Getz Balich LLC

(57) ABSTRACT

An assembly is provided for an aircraft propulsion system. This assembly includes a nacelle exterior skin and a strake. The strake is configured with a base and an airfoil that projects out from the base. The base is recessed into and connected to the nacelle exterior skin.

16 Claims, 9 Drawing Sheets

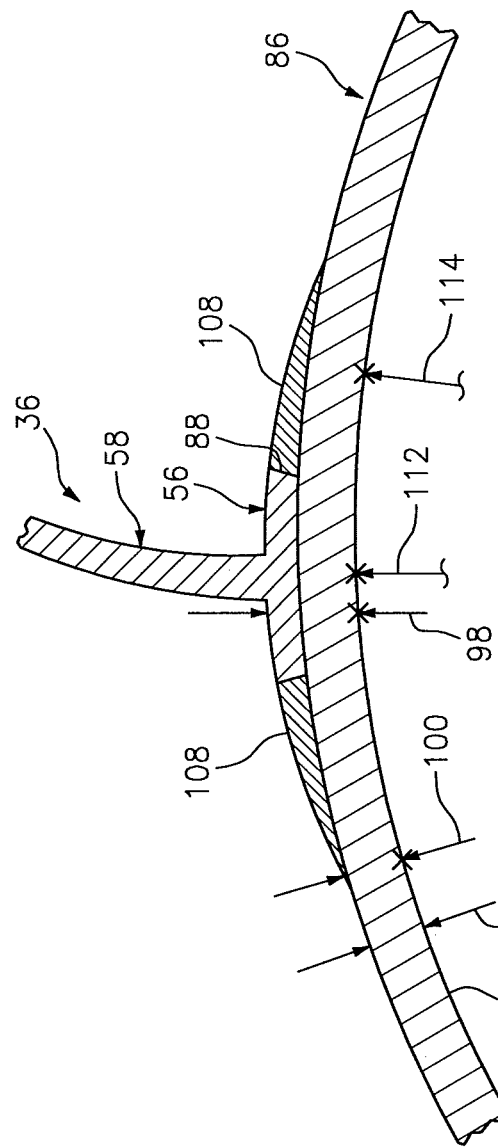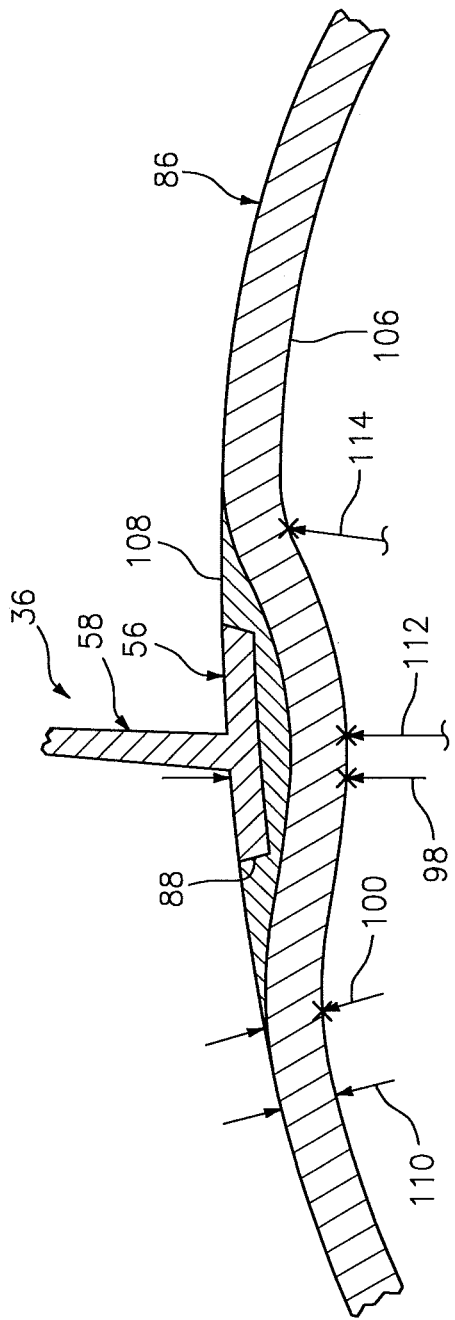

STRAKE FOR AIRCRAFT PROPULSION SYSTEM NACELLE

BACKGROUND

1. Technical Field

This disclosure relates generally to an aircraft propulsion system and, more particularly, to connecting a strake to a nacelle of an aircraft propulsion system.

2. Background Information

A modern aircraft propulsion system typically includes a gas turbine engine such as a turbofan engine housed within a nacelle. To increase lift during aircraft takeoff and landing, the nacelle may be configured with a strake.

The strake is typically located on a side of the nacelle that faces the aircraft fuselage near and forward of a leading edge of the aircraft wing. The strake is typically mounted radially on top of an outer skin of the nacelle and secured to the nacelle with an array of fasteners such as rivets or screws. While known strakes have various advantages, there is still room in the art for improvement, particularly to reduce strake drag during aircraft flight.

SUMMARY OF THE DISCLOSURE

According to an aspect of the present disclosure, an assembly is provided for an aircraft propulsion system. This assembly includes a nacelle exterior skin and a strake. The strake is configured with a base and an airfoil projecting out from the base. The base is recessed into and connected to the nacelle exterior skin.

According to another aspect of the present disclosure, another assembly is provided for an aircraft propulsion system. This assembly includes a nacelle cowl and a strake. The nacelle cowl includes an exterior skin. The strake is connected to the exterior skin. At least the exterior skin and the strake are configured together in a monolithic body.

According to still another aspect of the present disclosure, another assembly is provided for an aircraft propulsion system. This assembly includes a nacelle cowl and a strake. The nacelle cowl includes an exterior skin with an exterior flow surface. The strake includes a base and an airfoil projecting radially out from the base. The base is connected to the exterior skin. The base includes an exterior flow surface that is contiguous with a surface of the airfoil. The exterior flow surface of the base is vertically flush with the exterior flow surface of the exterior skin.

The nacelle exterior skin may include an exterior flow surface. The base may include an exterior flow surface that is contiguous with a surface of the airfoil. The exterior flow surface of the base may be flush with the exterior flow surface of the nacelle exterior skin.

The base may be disposed within a pocket defined by the nacelle exterior skin.

The base may be fused to the nacelle exterior skin.

The base may be bonded to the nacelle exterior skin.

At least the nacelle exterior skin and the strake may be configured together as a monolithic body.

The base may include a plurality of flanges disposed on a common side of the airfoil.

The base may include a first flange and a second flange. The first flange may be disposed on a first side of the airfoil. The second flange may be disposed on a second side of the airfoil.

The nacelle exterior skin may be configured from or otherwise include thermoplastic material. In addition or alternatively, the strake may be configured from or otherwise include thermoplastic material.

The base may be recessed into and connected to the nacelle exterior skin. The nacelle exterior skin and the base may be configured with a plurality of perforations which include a first perforation having an inner portion and an outer portion. The inner portion may extend through and may be defined by the nacelle exterior skin. The outer portion may extend through and may be defined by the base.

The assembly may also include a duct of an active laminar flow control system. The perforations may be fluidly coupled with the duct.

The base may be recessed into and connected to the nacelle exterior skin. The base may have a lateral width. A vertical thickness of a combination of the nacelle exterior skin and the base may be substantially equal to a vertical thickness of the nacelle exterior skin a lateral distance away from the base. The lateral distance may be substantially equal to the lateral width.

The base may be recessed into and connected to the nacelle exterior skin. The base may have a lateral width. A vertical thickness of a combination of the nacelle exterior skin and the base may be greater than a vertical thickness of the nacelle exterior skin a lateral distance away from the base. The lateral distance may be substantially equal to the lateral width.

The nacelle exterior skin may include a plurality of fibers within a polymer matrix, where at least some of the fibers may be continuous fibers. A base portion of the nacelle exterior skin may include the continuous fibers within the polymer matrix. A buildup portion of the nacelle exterior skin may include the polymer matrix. The base of the strake may be received within a pocket that extends at least partially into the buildup portion and radially inwards towards the base portion.

The base of the strake may have a lateral width. An inner radius of the base portion of the nacelle exterior skin at a first location aligned with the airfoil may be approximately equal to an inner radius of the base portion of the nacelle exterior skin at a second location disposed a lateral distance from the first location. The lateral distance may be substantially equal to the lateral width.

The base of the strake may have a lateral width. An inner radius of the base portion of the nacelle exterior skin at a first location aligned with the airfoil may be less than an inner radius of the base portion of the nacelle exterior skin at a second location disposed a lateral distance from the first location. The lateral distance may be substantially equal to the lateral width.

The assembly may also include a fan cowl that includes the nacelle exterior skin.

The assembly may also include a nacelle inlet structure comprising the nacelle exterior skin.

The base may be configured as or otherwise include a flange that projects laterally away from the airfoil. The airfoil may project vertically out from the base.

The nacelle may include an exterior flow surface. The strake may include a base and an airfoil projecting vertically out from the base. The base may include an exterior flow surface that is contiguous with a surface of the airfoil. The exterior flow surface of the base may be vertically flush with the exterior flow surface of the nacelle.

The foregoing features and the operation of the invention will become more apparent in light of the following description and the accompanying drawings.

BRIEF DESCRIPTION OF THE DRAWINGS

FIG. 9 is a cross-sectional illustration of a portion of another nacelle exterior skin configured with a strake.

FIG. 10 is a cross-sectional illustration of a portion of another nacelle exterior skin configured with a strake.

DETAILED DESCRIPTION

Figure 1:
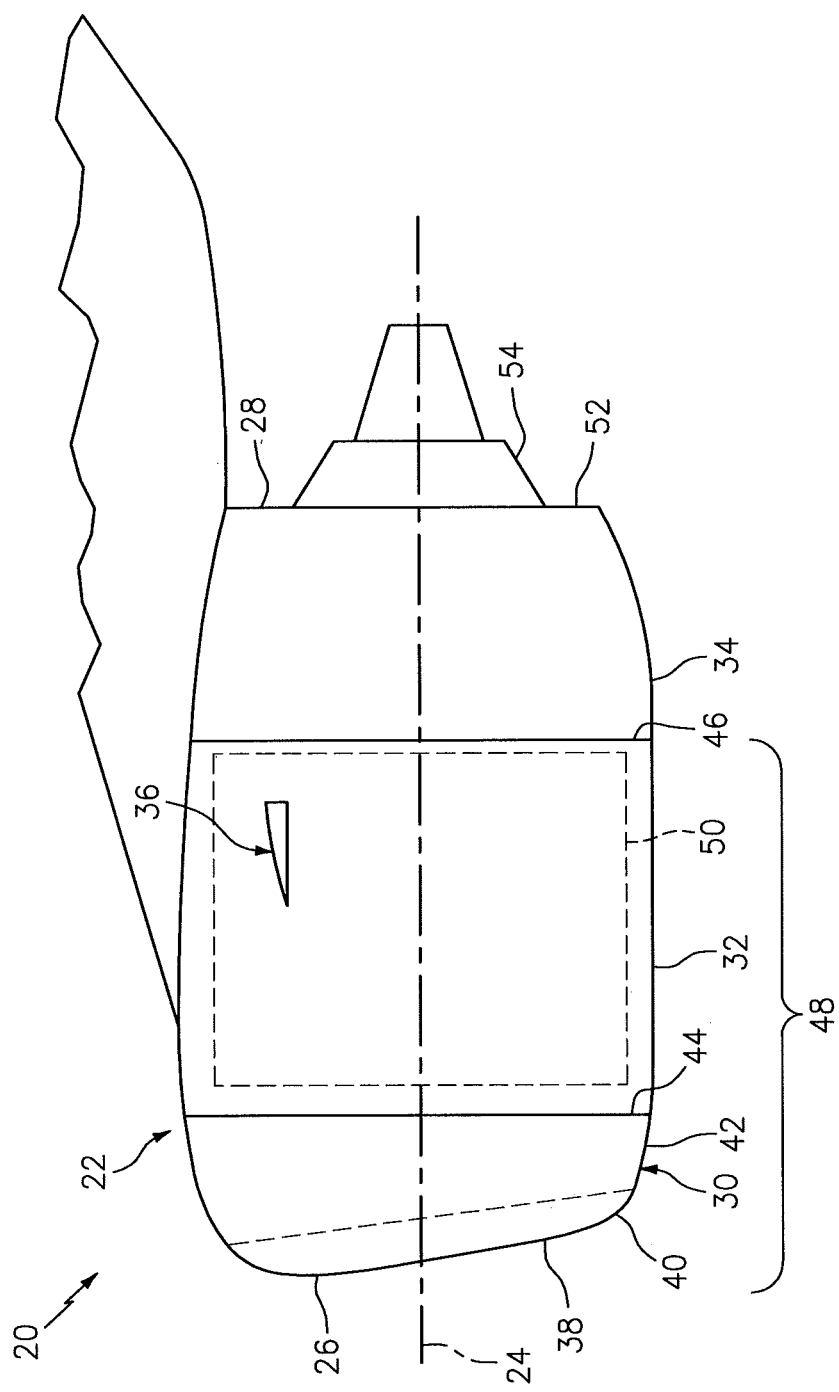
FIG. 1 is a side illustration of an aircraft propulsion system.

FIG. 1 illustrates an aircraft propulsion system 20 for an aircraft such as, but not limited to, a commercial airliner or a cargo plane. The propulsion system 20 includes a nacelle 22 and a gas turbine engine. This gas turbine engine may be configured as a high-bypass turbofan engine. Alternatively, the gas turbine engine may be configured as a low-bypass turbofan engine, a turbojet engine or any other type of gas turbine engine capable of propelling the aircraft during flight.

The nacelle 22 is configured to house and provide an aerodynamic cover for the gas turbine engine. The nacelle 22 extends along an axial centerline 24 between a nacelle forward end 26 and a nacelle aft end 28. The nacelle 22 of FIG. 1 includes a nacelle inlet structure 30, one or more fan cowls 32 (one such cowl visible in FIG. 1) and a nacelle aft structure 34, which may be configured as part of or include a thrust reverser system. The nacelle 22 also includes at least one strake 36 (also sometimes referred to as a "chine").

The inlet structure 30 is disposed at the nacelle forward end 26. The inlet structure 30 is configured to direct a stream of air through an inlet opening 38 at the nacelle forward end 26 and into a fan section of the gas turbine engine. The inlet structure 30 of FIG. 1 includes an annular inlet lip 40 and a tubular outer barrel 42 (e.g., a cowl).

The inlet lip 40 forms a leading edge of the nacelle 22 as well as the inlet opening 38. The inlet lip 40 has a cupped (e.g., generally U-shaped) cross-sectional geometry, which extends circumferentially as an annulus around the axial centerline 24.

The outer barrel 42 extends circumferentially around the axial centerline 24. The outer barrel 42 extends axially along the axial centerline 24 between the inlet lip 40 and an aft end 44 of the inlet structure 30.

The fan cowls 32 are disposed axially between the inlet structure 30 and the aft structure 34. Each fan cowl 32 of FIG. 1, in particular, is disposed at an aft end 46 of a stationary portion 48 of the nacelle 22, and extends forward to the aft end 44 of the inlet structure 30. Each fan cowl 32 is generally axially aligned with the fan section of the gas turbine engine. The fan cowls 32 are configured to provide an aerodynamic covering for a fan case 50. Briefly, this fan case 50 circumscribes the fan section and partially forms a forward outer peripheral boundary of a bypass flowpath of the propulsion system 20.

The term "stationary portion" is used above to describe a portion of the nacelle 22 that is stationary during propulsion system 20 operation (e.g., during takeoff, aircraft flight and landing). However, the stationary portion 48 may be otherwise movable for propulsion system 20 inspection/maintenance; e.g., when the propulsion system 20 is non-operational. Each of the fan cowls 32, for example, may be configured to provide access to components of the gas turbine engine such as the fan case 50 and/or peripheral equipment configured therewith for inspection, maintenance and/or otherwise. In particular, each of fan cowls 32 may be pivotally mounted with the aircraft propulsion system 20 by, for example, a pivoting hinge system. Alternatively, the fan cowls 32 and the inlet structure 30 may be configured into a single axially translatable body for example, which may be referred to as a "fanlet". The present disclosure, of course, is not limited to the foregoing fan cowl configurations and/or access schemes.

The aft structure 34 of FIG. 1 is disposed at the nacelle aft end 28. The aft structure 34 is configured to form a bypass nozzle 52 for the bypass flowpath with an inner assembly/portion 54 of the nacelle 22; e.g., an inner fixed structure (IFS). The aft structure 34 may include one or more translating sleeves (one such sleeve visible in FIG. 1) for the thrust reverser system. The present disclosure, however, is not limited to such a translatable sleeve thrust reverser system, or to an aircraft propulsion system with a thrust reverser system.

Figure 2:
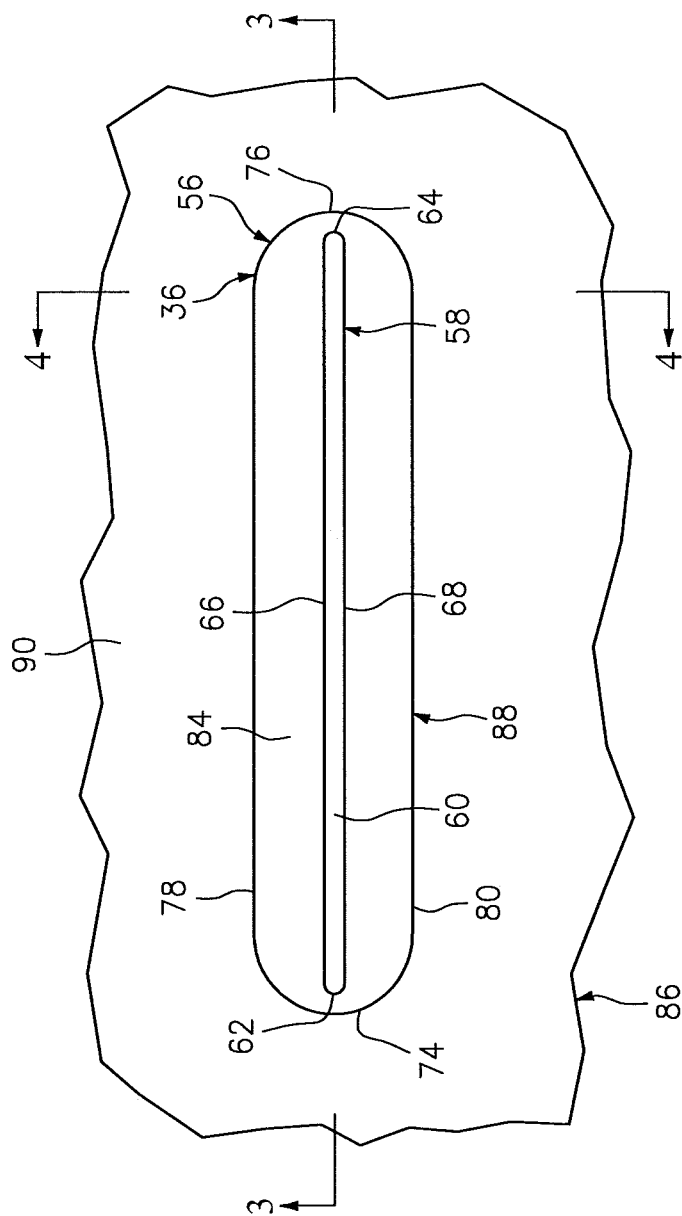
FIG. 2 is an illustration of a portion of a nacelle exterior skin configured with a strake.
Figure 3:
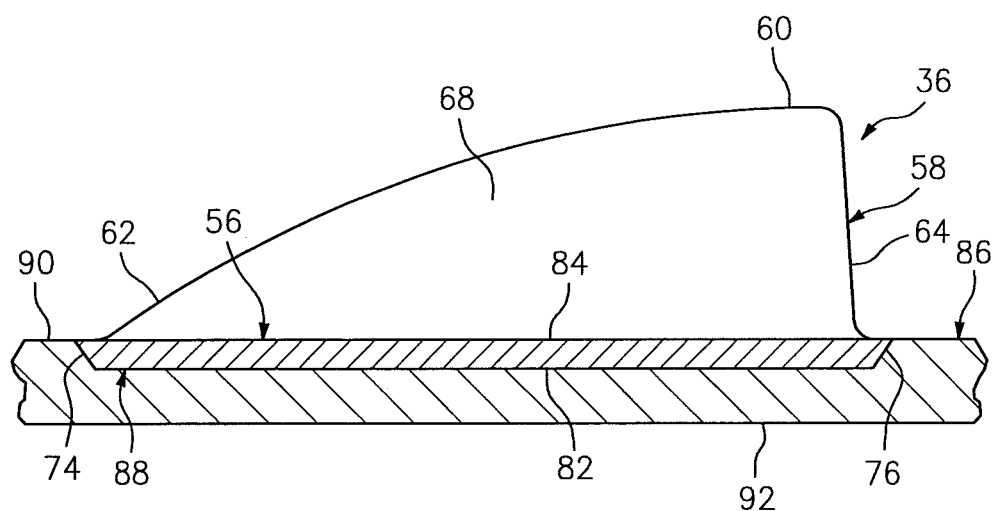
FIG. 3 is a side sectional illustration of the assembly of FIG. 2.
Figure 4:
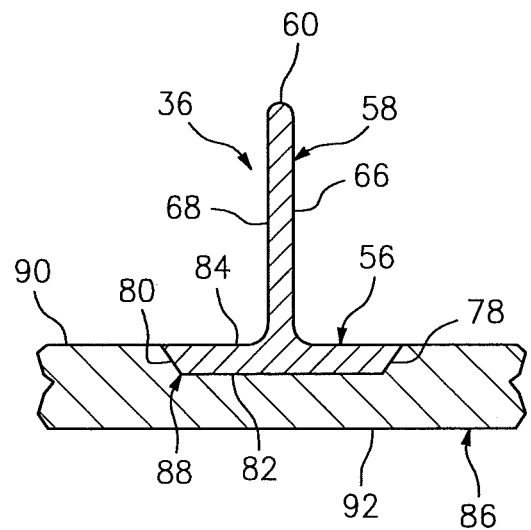
FIG. 4 is a cross-sectional illustration of the assembly of FIG. 2.

Referring to FIGS. 2-4, the strake 36 includes a base 56 and an airfoil 58. The airfoil 58 is connected to the base 56. The airfoil 58 of FIGS. 2-4, for example, is formed integral with the base 56. However, in other embodiments, the airfoil 58 may be fused, adhered and/or otherwise attached to the base 56. The airfoil 58 projects vertically outward from the base 56 to a distal airfoil tip 60, where the vertical direction may be a generally radial direction relative to the axial centerline 24 of the propulsion system 20; see FIG. 1. The airfoil 58 extends longitudinally between a leading edge 62 and a training edge 64, where the longitudinal direction may be a generally axial direction relative to the axial centerline 24 of the propulsion system 20; see FIG. 1. The airfoil 58 extends laterally between a first side surface 66 and a second side surface 68, where the lateral direction may be a generally circumferential or tangential direction relative to the axial centerline 24 of the propulsion system 20; see FIG. 1. The first side surface 66 and the second side surface 68 of FIGS. 2-3 are substantially planar. Alternatively, the side surfaces 66 and 68 may each be convex. The present disclosure, however, is not limited to the foregoing exemplary airfoil configurations. For example, the airfoil 58 may have a curved chamber line that extends between the leading edge 62 and the training edge 64. In such an embodiment, one of the side surfaces 66, 68 may be convex and the other one of the side surfaces 68, 66 may be correspondingly concave. Thus, one of the side surfaces 66, 68 may be a pressure side surface and the other one of the side surfaces 68, 66 may be a suction side surface. In addition or alternatively to the foregoing configurations, the airfoil 58 may have a substantially straight base-to-tip span as shown in FIG. 4, or a curved base-to-tip span.

Figure 5:
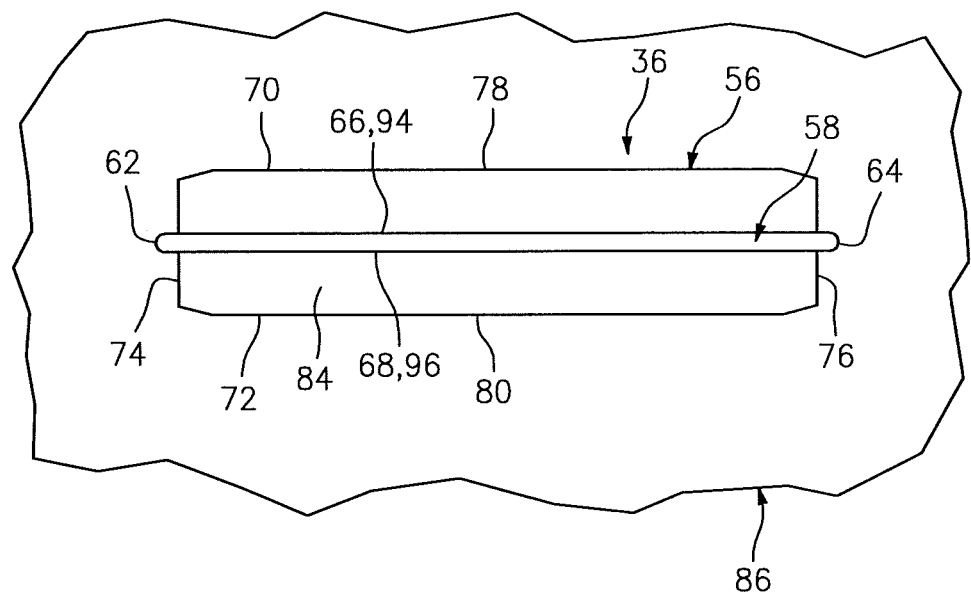
FIG. 5 is an illustration of a portion of a nacelle exterior skin configured with another strake.
Figure 6:
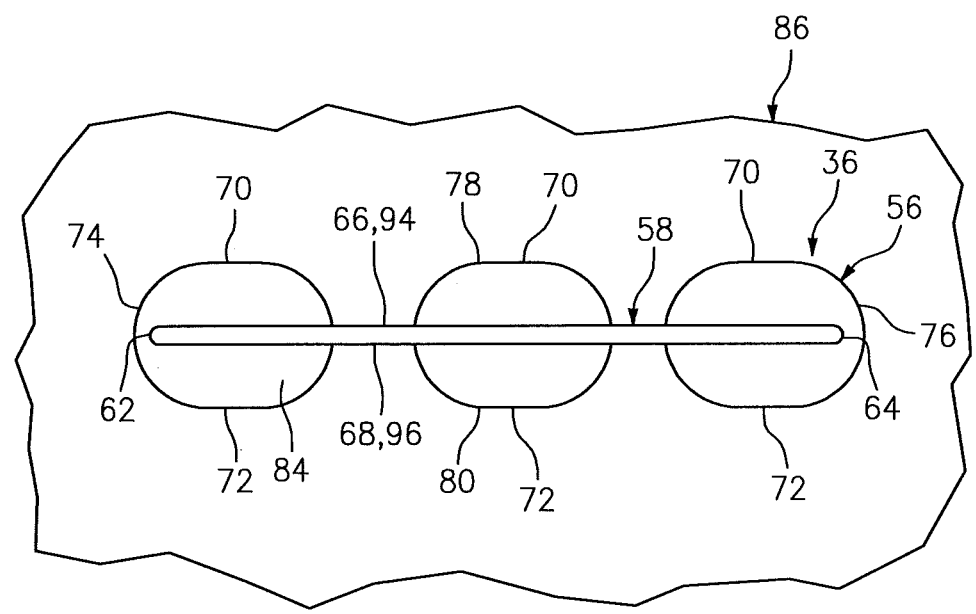
FIG. 6 is an illustration of a portion of a nacelle exterior skin configured with another strake.

The base 56 may be configured as a plate as best seen in FIG. 2. The base 56 may alternatively (or additionally) include one or more flanges 70 and 72 as shown in FIGS. 5 and 6. Referring again to FIGS. 2-4, the base 56 extends longitudinally between a forward end 74 and an aft end 76. The base 56 extends laterally between opposing lateral sides 78 and 80. The base 56 extends vertically between an interior surface 82 and an exterior flow surface 84, which surface 84 is contiguous with (e.g., touches and/or is immediately adjacent to) the side surfaces 66 and 68. The surface 84 is termed an "exterior flow surface" because the surface 84 partially forms an outer peripheral surface of the nacelle 22 exposed to the flow of air outside of the nacelle 22; see FIG. 3.

The strake 36 and, more particularly, the base 56 is connected to an exterior skin 86 of the nacelle 22. This exterior skin 86 may be configured as or otherwise included in a respective one of the fan cowls 32 (see FIG. 1) such as, but not limited to, the fan cowl 32 closest to (or farthest from) a fuselage of the aircraft. The exterior skin 86 may alternatively (or additionally) be configured as or otherwise included in the inlet structure 30 and, more particularly, the outer barrel 42. The present disclosure, however, is not limited to the foregoing exemplary strake locations.

The base 56 of FIGS. 2-4 is completely (or at least partially) recessed vertically into the exterior skin 86. More particularly, the base 56 is received within a pocket 88 formed in the exterior skin 86. This pocket 88 extends vertically inwards into the exterior skin 86 from an exterior flow surface 90 of the skin to a bottom pocket surface of the skin 86. The surface 90 is termed an "exterior flow surface" because the surface 90 partially forms the outer peripheral surface of the nacelle 22 exposed to the flow of air outside of the nacelle 22; see FIG. 3. The pocket 88 of FIGS. 2-4 is sized to completely receive the base 56 such that the exterior flow surface 84 is substantially vertically flush with the exterior flow surface 90. With such a flush joint between the base 56 and the exterior skin 86, the air flowing of outside of the nacelle 22 may pass over the joint, for example, without being tripped into a turbulent air flow and/or otherwise increasing nacelle 22 drag.

Figure 7:
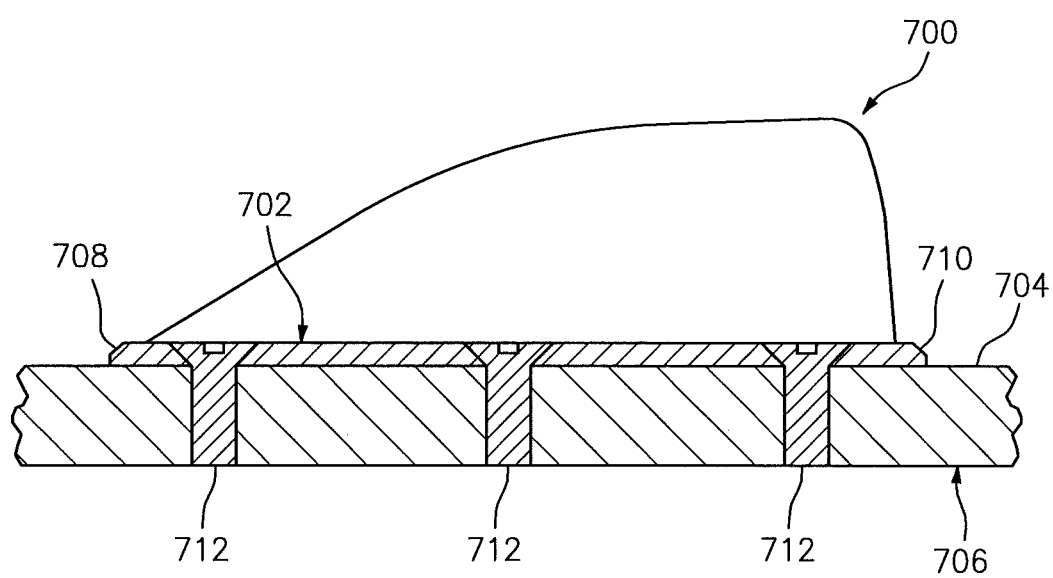
FIG. 7 is a side sectional illustration of a portion of a nacelle exterior skin configured with a prior art strake.

In contrast to the strake 36 of FIGS. 2-4, a prior art strake 700 as shown in FIG. 7 typically includes a base 702 that is mechanically attached to an exterior flow surface 704 of an exterior skin 706 of a nacelle. Each edge 708 and 710 of the base 702—even when beveled or otherwise tapered—forms a ridge that can trip a laminar flow into a turbulent flow and can increase drag. Mechanical fasteners 712 that attach the base 702 to the exterior skin 706 also create and/or have disruptions (e.g., apertures and/or protrusions) that can trip a laminar flow into a turbulent flow and can increase drag.

Referring again to FIGS. 2-4, the base 56 (and/or the airfoil 58 in some embodiments) may be connected to the exterior skin 86 using various connection techniques. For example, the base 56 may be connected to the exterior skin 86 by fusing (e.g., welding) material from the components 36 and 86 together. This connection technique is particularly useful, but is not limited to, where the strake 36 material is similar or the same as the exterior skin 86 material; e.g., thermoplastic material. In another example, the base 56 may be bonded (e.g., adhered) to the exterior skin 86 using epoxy or another adhesive material. This connection technique may be useful, but is not limited to, where the strake 36 material is dissimilar than the exterior skin 86 material or both the strake 36 material and the exterior skin 86 material are thermoset composite materials. In still another example, the base 56 may be mechanically attached to the exterior skin 86 where, for example, one or more fasteners are extend through the exterior skin 86 and into the strake 36 from a back side surface 92 of the exterior skin 86. The present disclosure, of course, is not limited to the foregoing exemplary connection techniques.

In some embodiments, at least the exterior skin 86 and the strake 36 may be configured in a monolithic body. Herein, the term "monolithic" may describe an object which is configured as a single unitary body. The strake 36, for example, may be cast, injection molded, machined, additively manufactured and/or otherwise formed integral with the exterior skin 86. Alternatively, the strake 36 and the exterior skin 86 may be formed as discrete bodies and, subsequently, fused, bonded or otherwise fixedly and/or permanently attached to one another without requiring fasteners. In contrast, the prior art assembly shown in FIG. 7 forms a multi-piece component and, thus, not a monolithic body because use of the fasteners 712 are required to mount the strake 700 to the exterior skin 706.

Referring to FIGS. 5 and 6, the base 56 may include one or more flanges 70 and 72 as described above. For example, in the embodiment of FIG. 5, the base 56 include a first flange 70 and a second flange 72. Each flange 70, 72 projects laterally away from the airfoil 58 to a respective distal end. The first flange 70 is disposed on a first side 94 of the airfoil 58. The second flange 72 is disposed on a second side 96 of the airfoil 58. Similarly, in the embodiment of FIG. 6, the base 56 includes a plurality of first flanges 70 and a plurality of second flanges 72. Each of the first flanges 70 are disposed on the first side 94 (e.g., a respective common side) of the airfoil 58. The second flanges 72 are disposed on the second side 96 (e.g., a respective common side) of the airfoil 58. Longitudinally adjacent pairs of the flanges 70, 72 may be separated by a non-zero longitudinal distance. The present disclosure, of course, is not limited to the exemplary number and exemplary configuration of flanges 70 and 72 described above and illustrated in the drawings.

Figure 8:
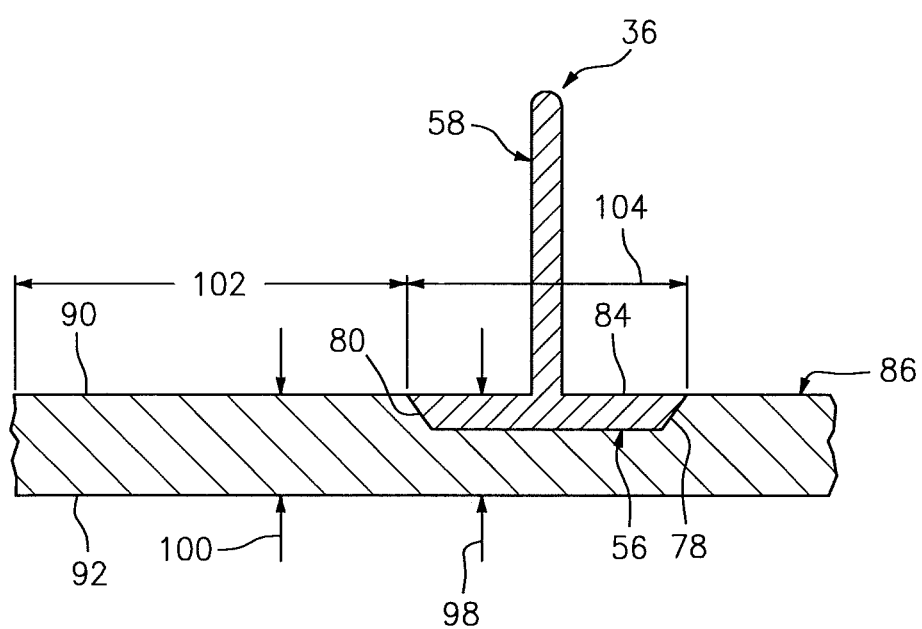
FIG. 8 is another cross-sectional illustration of the assembly of FIG. 2.

Referring to FIG. 8, the base 56 and the exterior skin 86 may define a first vertical thickness 98 at a first location, which is laterally at the airfoil 58. This first vertical thickness 98 extends vertically between the back side surface 92 and the exterior flow surface 84. The exterior skin 86 may define a second vertical thickness 100 at a second location, which is disposed a lateral distance 102 away from the base 56. This lateral distance 102 may be substantially equal to or greater than a lateral width 104 of the base 56, which extends between the opposing lateral sides 78 and 80. The second vertical thickness 100 extends vertically between the back side surface 92 and the exterior flow surface 90. The second vertical thickness 100 may be substantially equal to the first vertical thickness 98 as illustrated in FIG. 8. Alternatively, the first vertical thickness 98 may be less than the second vertical thickness 100 as illustrated in FIGS. 9 and 10.

The strake 36 and the exterior skin 86 may be manufactured from various materials. In some embodiments, the strake 36 material may be the same as the exterior skin 86 material. In other embodiments, the strake 36 material may be different from the exterior skin 86 material. Examples of suitable strake 36 and/or exterior skin 86 materials include, but are not limited to, thermoplastic material, thermoset material, composite material that includes fiber reinforcement within a polymer (e.g., thermoplastic or thermoset) matrix. Examples of suitable fiber reinforcement include, but are not limited to, carbon fiber, fiberglass, aramid fibers (e.g., Kevlar® material) and/or a combination of one or more thereof. The present disclosure, however, is not limited to the foregoing exemplary materials, nor polymer and/or composite materials.

The fiber reinforcement may come in various forms that include, but are not limited to, continuous fibers, long fibers and/or short (e.g., chopped) fibers. The term "continuous fiber" may be used to describe fibers which run at least a majority (e.g., at least 75%-95%) of a distance between opposing ends of a component. For example, one or more continuous fibers may run longitudinally at least a majority of the distance between the opposing ends of the fan cowl 32. In another example, one or more of the continuous fibers may run circumferentially at least a majority of the distance between the opposing circumferential edges of the fan cowl 32; e.g., between a top edge and a bottom edge. Such continuous fibers provide fiber continuity within the component and, thereby, may provide greater strength and/or stiffness and/or durability.

FIGS. 9 and 10 illustrate exemplary embodiments of the exterior skin 86 formed with continuous fibers within a polymer (e.g., thermoplastic or thermoset) matrix. In order to maintain the continuity of the continuous fibers as they pass beneath the strake 36, the exterior skin 86 includes a base portion 106 and a buildup portion 108.

The base portion 106 of FIGS. 9 and 10 is configured to maintain a substantially constant thickness 110 as the base portion 106 extends around the axial centerline, particularly proximate and vertically beneath the strake 36. In this manner, continuous fibers laid within the base portion 106 are not cut or interrupted by the pocket 88. The buildup portion 108, by contrast, may be configured without the continuous fibers and is disposed vertically on top of the base portion 106 proximate the location of the strake 36. The buildup portion 108 is used to build up the overall vertical thickness of the exterior skin 86 in such a manner so as to form the side surfaces of the pocket 88 (see FIG. 9), or the side surfaces and the bottom surface of the pocket 88 (see FIG. 10).

In the specific embodiment of FIG. 9, the base portion 106 follows a substantially uninterrupted circumferential trajectory. In this manner, an inner radius 112 of the base portion 106 at the first location may be substantially equal to an inner radius 114 of the base portion 106 at another location dispose a lateral distance from the first location. This lateral distance may be substantially equal to or greater than the lateral width 104 of the base 56.

In the specific embodiment of FIG. 9, the base portion 106 follows a circumferential trajectory that dips down vertically beneath the strake 36. In this manner, the inner radius 112 of the base portion 106 at the first location may be less than the inner radius 114 of the base portion 106 at the other location.

Figure 11:
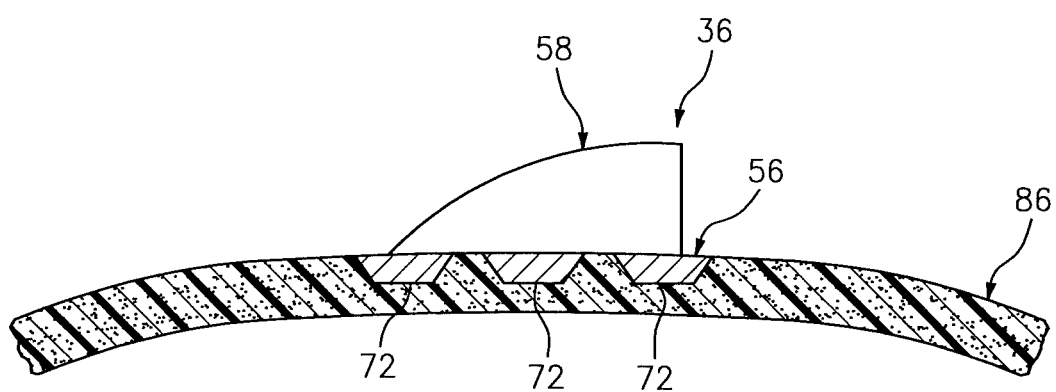
FIG. 11 is a side sectional illustration of the assembly of FIG. 6.

In some embodiments, where the base 56 is configured with the longitudinally interspaced flanges 72 (or 72) as shown in FIG. 11, continuous fibers may run uninterrupted in portions of the exterior skin 86 between the flanges 72 (or 70).

Figure 12:
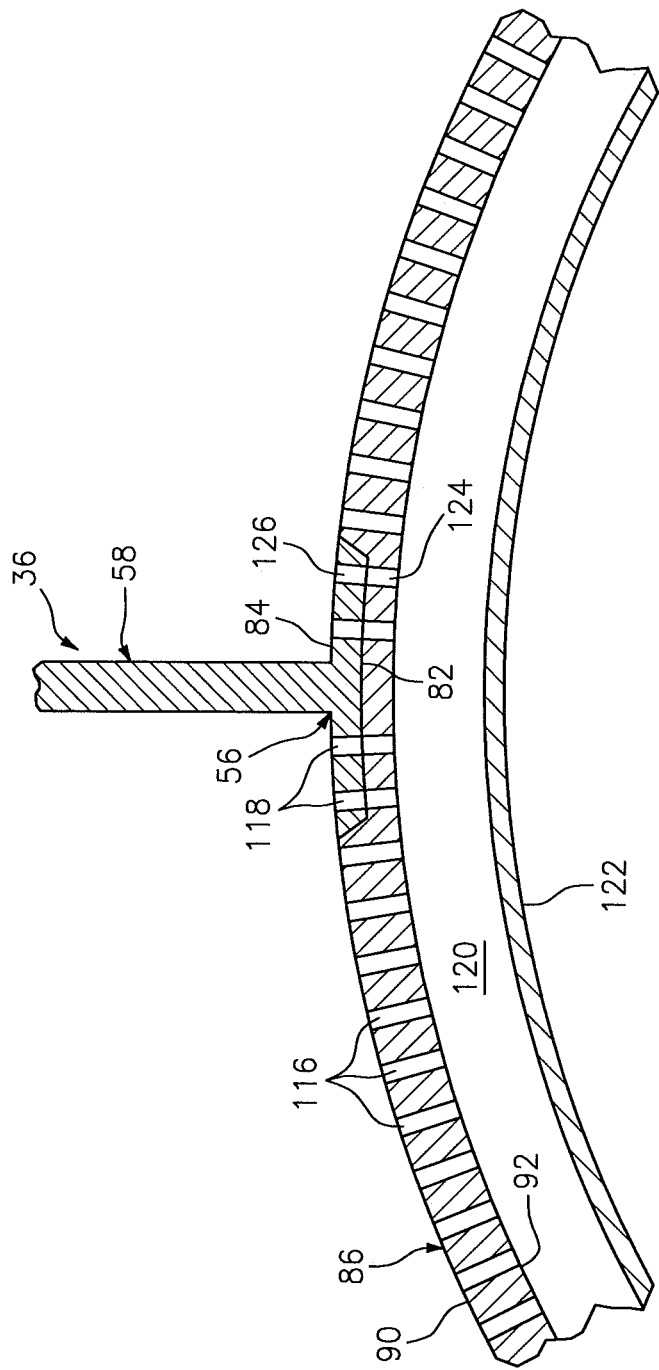
FIG. 12 is a cross-sectional illustration of a portion of another nacelle exterior skin configured with a strake.

In some embodiments, referring to FIG. 12, the exterior skin 86 and the base 56 may be configured with a plurality of perforations 116 and 118. These perforations 116 and 118 may be fluidly coupled to a duct 120 of an active laminar flow control (ALFC) system, which draws boundary layer air into the duct 120 through the perforations 116 and 118 to promote laminar flow adjacent the nacelle 22. A wall 122 of the duct 120 may be attached to the exterior skin 86 at the back side surface 92.

Some of the perforations 116 are formed by (e.g., just) the exterior skin 86. One or more of the other perforations 118 are formed by both the exterior skin 86 and the base 56. For example, each perforation 118 of FIG. 12 includes an inner portion 124 and an outer portion 126. The inner portion 124 is formed by and extends vertically through the exterior skin 86 from the back side surface 92 to the bottom surface of the pocket 88. The outer portion 126 is formed by and extends vertically through the base 56 from the surface 82 to the surface 84. The outer portion 126, of course, is also aligned with and fluidly coupled with a respective inner portion 124 to thereby form a respective perforation 118.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An assembly for an aircraft propulsion system, comprising:
   a nacelle exterior skin configured with an exterior flow surface, a bottom pocket surface and a pocket that extends partially into the nacelle exterior skin from the exterior flow surface to the bottom pocket surface; and
   a strake configured with a base and an airfoil projecting out from the base, wherein the base is received within the pocket and recessed into and connected to the nacelle exterior skin.

2. The assembly of claim 1, wherein the base comprises an exterior flow surface that is contiguous with a surface of the airfoil, and the exterior flow surface of the base is flush with the exterior flow surface of the nacelle exterior skin.

3. The assembly of claim 1, wherein the base is fused to the nacelle exterior skin.

4. The assembly of claim 1, wherein the base is bonded to the nacelle exterior skin.

5. The assembly of claim 1, wherein the base includes a plurality of flanges disposed on a common side of the airfoil.

6. The assembly of claim 1, wherein the base includes a first flange and a second flange, the first flange is disposed on a first side of the airfoil, and the second flange is disposed on a second side of the airfoil.

7. The assembly of claim 1, wherein the nacelle exterior skin comprises thermoplastic material, and the strake comprises thermoplastic material.

8. The assembly of claim 1, wherein
   the nacelle exterior skin and the base are configured with a plurality of perforations which include a first perforation having an inner portion and an outer portion;
   the inner portion extends through and is defined by the nacelle exterior skin; and
   the outer portion extends through and is defined by the base.

9. The assembly of claim 8, further comprising a duct of an active laminar flow control system, wherein the perforations are fluidly coupled with the duct.

10. The assembly of claim 1, wherein
    the base has a lateral width; and
    a vertical thickness of a combination of the nacelle exterior skin and the base is substantially equal to a vertical thickness of the nacelle exterior skin a lateral distance away from the base, the lateral distance being substantially equal to the lateral width.

11. The assembly of claim 1, wherein
the base has a lateral width; and
a vertical thickness of a combination of the nacelle exterior skin and the base is greater than a vertical thickness of the nacelle exterior skin a lateral distance away from the base, the lateral distance being substantially equal to the lateral width.

12. The assembly of claim 1, wherein
the nacelle exterior skin comprises a plurality of fibers within a polymer matrix, at least some of the fibers being continuous fibers;
a base portion of the nacelle exterior skin comprises the continuous fibers within the polymer matrix;
a buildup portion of the nacelle exterior skin comprises the polymer matrix; and
the base of the strake is received within the pocket that extends at least partially into the buildup portion and radially inwards towards the base portion.

13. The assembly of claim 12, wherein
the base of the strake has a lateral width; and
an inner radius of the base portion of the nacelle exterior skin at a first location aligned with the airfoil is approximately equal to an inner radius of the base portion of the nacelle exterior skin at a second location disposed a lateral distance from the first location, the lateral distance being substantially equal to the lateral width.

14. The assembly of claim 12, wherein
the base of the strake has a lateral width; and
an inner radius of the base portion of the nacelle exterior skin at a first location aligned with the airfoil is less than an inner radius of the base portion of the nacelle exterior skin at a second location disposed a lateral distance from the first location, the lateral distance being substantially equal to the lateral width.

15. The assembly of claim 1, further comprising a fan cowl comprising the nacelle exterior skin.

16. The assembly of claim 1, further comprising a nacelle inlet structure comprising the nacelle exterior skin.

* * * * *